United States Patent

[19] Pandeles

[11] Patent Number: 5,855,086
[45] Date of Patent: Jan. 5, 1999

[54] FISHING ROD BELT

[76] Inventor: John P. Pandeles, 517 Bourdet, Walnut, Calif. 91789

[21] Appl. No.: 877,323

[22] Filed: Jun. 17, 1997

Related U.S. Application Data

[63] Continuation of Ser. No. 614,486, Mar. 13, 1996, abandoned.

[51] Int. Cl.⁶ .................................................. A01K 97/10
[52] U.S. Cl. ............................................. 43/21.2; 224/922
[58] Field of Search .............................. 43/21.2; 224/200, 224/660, 661, 662, 922

[56] References Cited

U.S. PATENT DOCUMENTS

| | | | |
|---|---|---|---|
| 1,985,985 | 1/1935 | Gerline | 224/922 |
| 2,271,136 | 1/1942 | Geiger | 224/660 |
| 2,576,624 | 11/1951 | Miller | 224/200 |
| 2,742,210 | 4/1956 | Bortz | 224/922 |
| 2,817,472 | 12/1957 | Parkhurst | 224/922 |
| 2,969,899 | 1/1961 | Brooks | 224/922 |
| 3,115,997 | 12/1963 | Hengst | 224/922 |
| 3,885,721 | 5/1975 | Vanus | 224/922 |
| 4,747,527 | 5/1988 | Trumpower | 224/662 |
| 4,828,152 | 5/1989 | Pepping | 43/21.2 |
| 4,858,364 | 8/1989 | Butts | 43/21.2 |

*Primary Examiner*—Robert P. Swiatek
*Attorney, Agent, or Firm*—Boniard I. Brown

[57] ABSTRACT

A fishing rod belt has a waist bar, belt strap, latch, center bar, a pair of wings, and a plurality of gimbals for engaging a fishing rod. The waist bar and belt strap extend about the waist of a person and are secured with the latch. The center bar has an end attached to the waist bar and is attached to the wings. The gimbals are attached to the center bar in spaced relation and enable the securing of the fishing rod in different positions. The wings are contoured and adapted to flex to provide a comfortable barrier between the fishing rod belt and legs of the person. The center bar may define a channel with first and second edge walls with the gimbals extending between the walls in spaced-apart relation. The latch may be a seat belt type of buckle or a slot and pin mechanism.

28 Claims, 2 Drawing Sheets

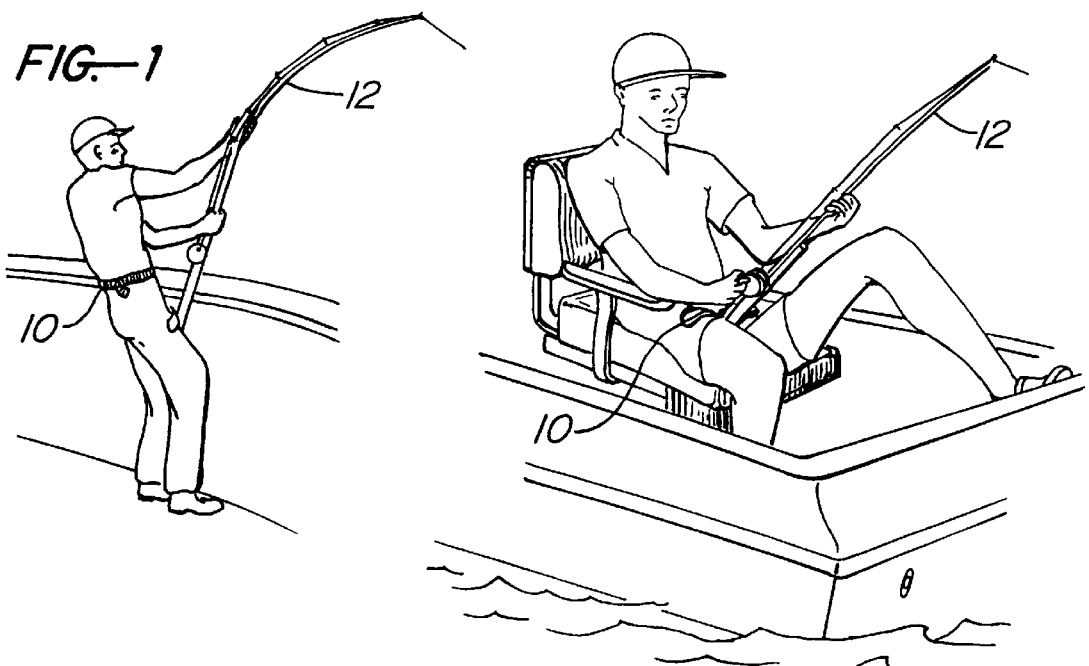
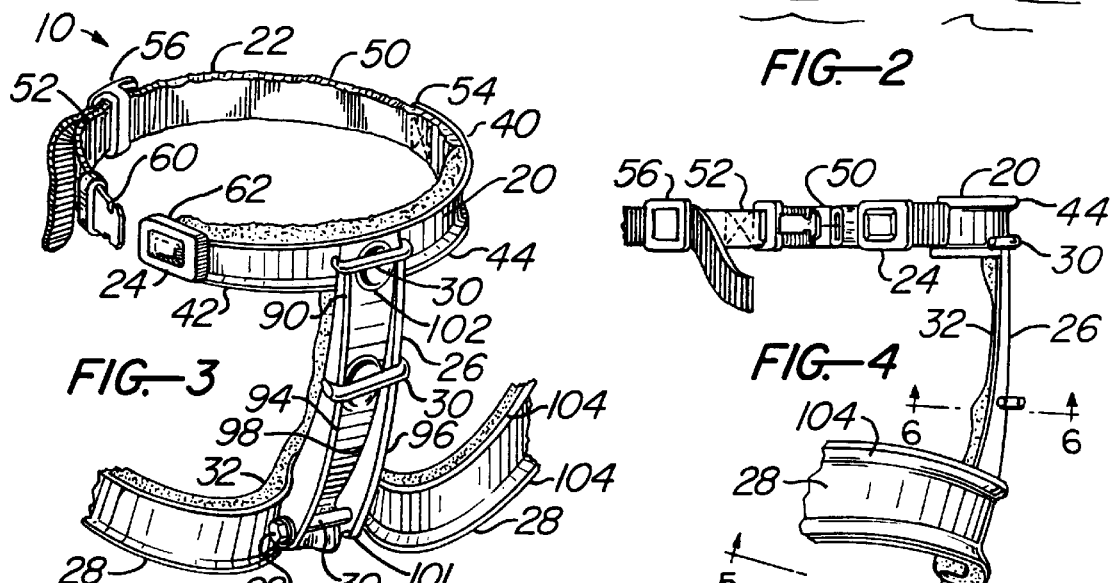
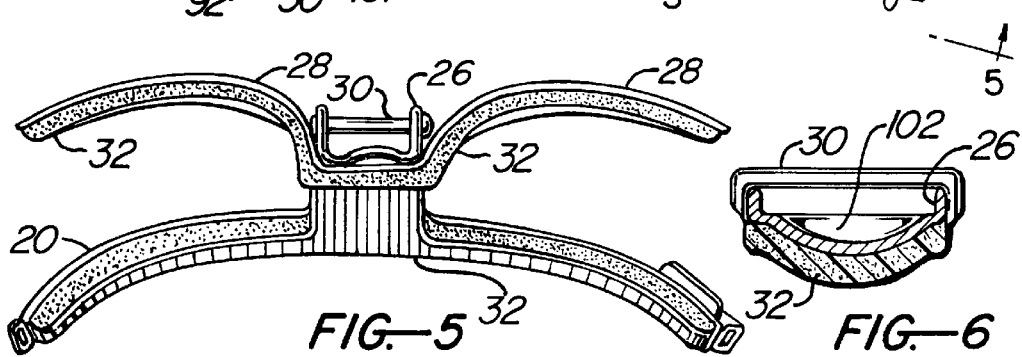

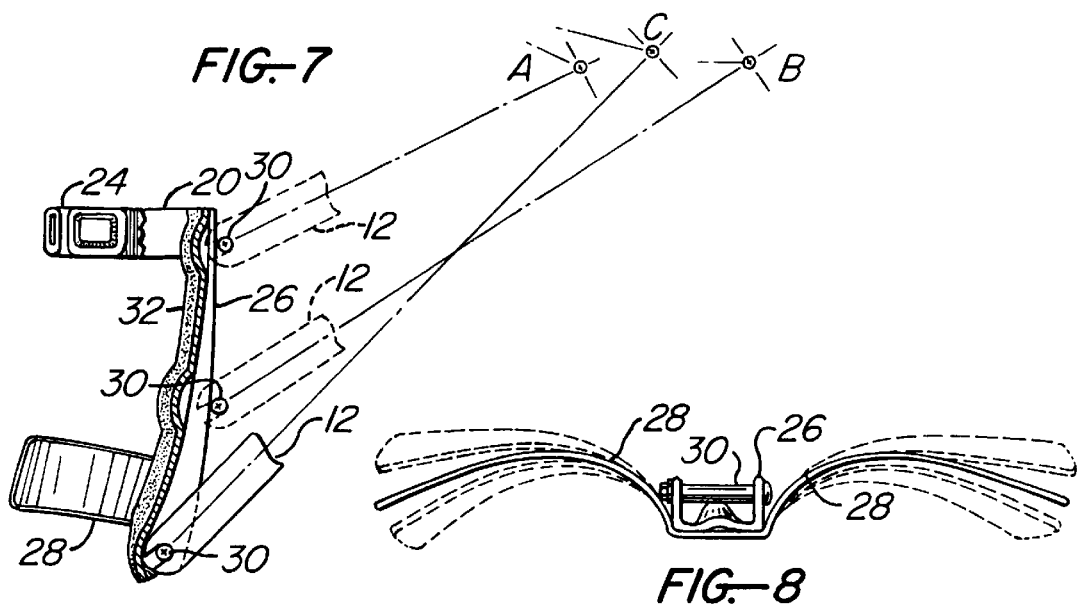
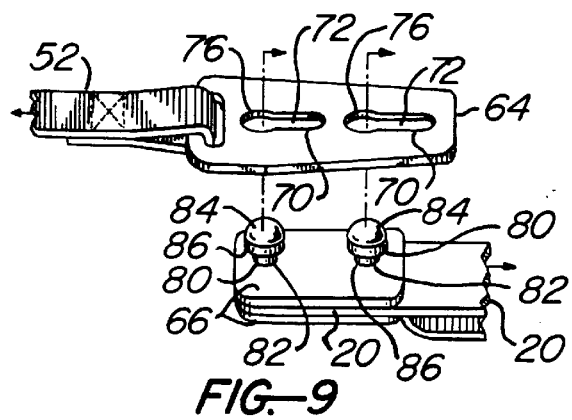
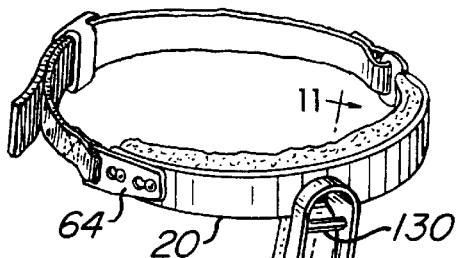
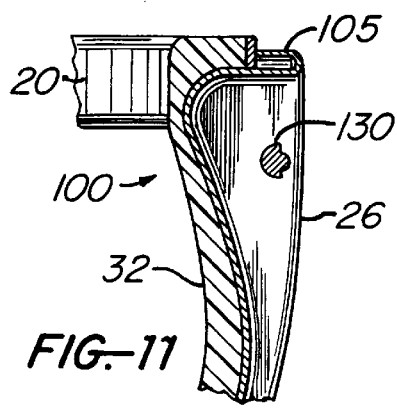
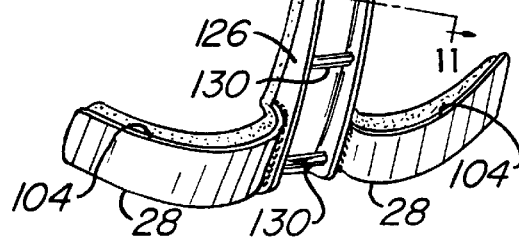

FISHING ROD BELT

This application is a continuation of application Ser. No. 08/614,486 filed on Mar. 13, 1996, and now abandoned.

BACKGROUND OF THE INVENTION

1. Field of the Invention

The present invention relates to fishing and, more particularly, to a fishing rod belt which is used to secure a fishing rod during the procedure of reeling in a fish.

2. Prior Developments

Due to the size and weight of the fish catch during deep sea fishing, a special fishing belt is used for engagement with a fishing rod. The fishing belt anchors the fishing rod and provides support and leverage during fishing. As an example, a wide-offset type of reel tends to twist during cranking of the reel, such as with a 300 lb. fish, causing the fishing rod to twist. Engagement of the fishing rod with a gimbal attached to the fishing belt substantially prevents the fishing rod from twisting. Substantial discomfort, pain, and interference with a person's effective performance often are involved with conventional fishing belts.

There are several kinds of fishing belts having a belt, a padded portion, and a gimbal for engagement with an end of the fishing rod. However, these fishing belts include only a single gimbal and it is often desirable to position the fishing rod in a location different from the position of the gimbal.

Therefore, there has existed a need for a fishing rod belt which has a plurality of gimbals positioned in various spaced locations for engagement with the fishing rod at a selected location.

There has existed a need for a fishing rod belt which has components which conform to the configuration of the person, particularly the thighs and upper legs of the person, and which can flex to conform to such configuration of the person.

SUMMARY OF THE INVENTION

The present invention relates to a fishing rod belt including a belt member sized and adapted to extend about the waist of a person and a center bar having first and second opposite ends. The first end of the center bar is attached to the belt member and the second end of the center bar is attached to a pair of wings, which oppositely extend from the center bar. The fishing rod belt also includes at least one gimbal attached to the center bar for engagement with a fishing rod.

The belt member of the fishing rod belt may include a waist bar sized and adapted to extend about a portion of the waist of the person, and a belt strap attached to the waist bar sized and adapted to extend about a portion of the waist of the person, the waist bar and the belt strap together extending about the waist of the person for securing the fishing rod belt to the person. The fishing rod belt further includes a latch having a first latch mechanism attached to one of the first and second ends of the belt member and a second latch mechanism attached to the other of the first and second ends of the belt member. A pad material may be attached to the belt member, the center bar and the wings for providing a comfortable barrier between the belt member, the center bar and the wings and the person.

Preferably, the fishing rod belt includes a plurality of gimbals and the center bar is a channel with a first edge wall and a second edge wall, and the gimbals extend between the first and second edge walls.

The components of the fishing rod belt have a limited flexibility to provide a comfortable fit and to distribute loads over the thigh areas of the person.

BRIEF DESCRIPTION OF THE DRAWINGS

FIG. 1 is a perspective view of a fishing rod engaged with a fishing rod belt positioned about the waist of a person in a standing position according to the present invention;

FIG. 2 is a perspective view of the fishing rod engaged with the fishing rod belt positioned about the waist of the person in a sitting position;

FIG. 3 is a perspective view of the fishing rod belt;

FIG. 4 is a side view of the fishing rod belt;

FIG. 5 is a view taken along line 5—5 of FIG. 4;

FIG. 6 is a view taken along line 6—6 of FIG. 4;

FIG. 7 is a view illustrating various positions of the fishing rod with respect to the fishing rod belt;

FIG. 8 is a view illustrating the flexible movement of wings of the fishing rod belt;

FIG. 9 illustrates a belt-latching arrangement utilized with the present invention;

FIG. 10 shows an alternative embodiment of the fishing rod belt of the invention; and FIG. 11 is a sectional view taken at 11—11 in FIG. 10.

DESCRIPTION OF A PREFERRED EMBODIMENT OF THE INVENTION

Referring to FIGS. 1 and 2, a fishing rod belt 10 is positioned about the waist of a person and is engaged with a fishing rod 12. The fishing rod belt 10 may be used by a person in a standing position or in a sitting position.

Referring to FIGS. 3–6, the fishing rod belt 10 includes a belt member having a waist bar 20 and a belt strap 22, a latch 24, a center bar 26, a pair of wings 28, at least one gimbal 30, and a pad material 32. The components of the fishing rod belt 10 are adapted to flex, enabling the device to conform to the body of a person and provide a comfortable fit, particularly in the region of the thighs or upper legs.

The waist bar 20 is sized and adapted to extend about a portion of the waist of the person and is formed of a rigid material, for example, any type of metal, such as stainless steel, titanium, or various alloys, reinforced plastic, or the like. A first end 40 of the waist bar 20 is attached to the belt strap 22 and a second end 42 of the waist bar 20 is attached to the latch 24. The waist bar 20 has at least one rib 44 attached to, such as by welding, or integrally formed therewith for providing support to the fishing rod belt 10. The waist bar 20 and ribs 44 have a curved configuration for conforming to the waist of a person.

The belt strap 22 is sized and adapted to extend about a portion of the waist of the person and is formed of a flexible material, such as any type of fabric. The belt strap 22 has a first belt portion 50 and a second belt portion 52. The first belt portion 50 is attached to the first end 40 of the waist bar 20, such as looped through a clip 54 and stitched, adhesively, with snaps, or the like. One of the first and second belt portions 50 and 52 is fixedly attached to a fastener 56 and the other of the first and second belt portions 50 and 52 is slidably attached to the fastener 56 for adjustment of the belt strap 22 to accommodate various sized persons.

The latch 24 includes a first latch mechanism 60 and a second latch mechanism 62. The first latch mechanism 60 is attached to the second belt portion 52 and the second latch mechanism 62 is attached to the waist bar 20 for securing together the belt member. The latch 24 may be any type of fastening mechanism, such as the first latch mechanism 60 being a male connector and the second latch mechanism 62 being a female connector, and may be formed of any type of metal, such as stainless steel, titanium, or various alloys, reinforced plastic, or the like.

For the various embodiments of this invention, the same reference characters will be used to designate like parts. In addition, like functions and like interactions of the parts among the various embodiments of this invention will not be repeated for each embodiment.

Referring to FIG. 9 and using the same reference characters to define like parts, an alternative embodiment of the first and second latch mechanisms 60 and 62 as illustrated in FIGS. 3–4 may be first and second latch mechanisms 64 and 66. The first latch mechanism 64 includes at least one slot 70 having a first opening 72 and a second opening 74. The second opening 74 has an enlarged portion 76, in comparison to the first opening 72. Preferably, the first latch mechanism 64 has a plurality of slots 70 in spaced apart relation for accommodating various sized persons.

The second latch mechanism 66 includes a pin 80 having a first end 82 and a second end 84. The second end 84 has an enlarged portion 86, in comparison to the first end 82. The enlarged portion 86 of the pin 80 is sized and adapted to fit within the enlarged portion 76 of the slot 70. The first end 82 of the pin 80 is sized and adapted to fit within the first end 72 of the slot 70. To secure the fishing rod belt 10 about the waist of the person, the pin 80 is positioned within the enlarged portion 76 of the slot 70. The pin 80 is slid through the slot 70 having the enlarged portion 86 of the pin 80 positioned outside of the slot 70 and the first end 82 of the pin 80 positioned within the first opening 72 of the slot 70 for capturing the pin 80 within the slot 70 and securing the belt strap 22 and the waist bar 20 together.

Alternatively, the slots 70 may be positioned in the second latch mechanism 66 and the pin 80 may be attached to the first latch mechanism 64. As yet another alternative, the second belt portion 52 may be attached to the second end 42 of the waist bar 20 and the second latch mechanism 62 may be attached to the second belt portion 52. One of the first and second belt portions 50 and 52 would be adjustable for varying the size of the belt member.

Referring to FIGS. 3–8 and 10, the center bar 26 of the fishing rod belt 10 has a first end 90 and a second end 92 and is formed of a rigid material, for example, any type of metal, such as stainless steel, titanium, or various alloys, reinforced plastic, or the like. The first end 90 of the center bar 26 is attached to the waist bar 20 and is positioned substantially perpendicular to the waist bar 20. As one example, the center bar 26 may be a channel having a first edge wall 94, a second edge 96, and a base 98 therebetween. The base 98 may have a plurality of indentations 102, recesses, apertures, or the like positioned adjacent to each respective pair of holes 101 for receiving an end of the fishing rod 12, while the fishing rod 12 is engaged in the fishing rod belt 10. The edges 94 and 96 of the channel may be sized such that the edges 94 and 96 are narrower at the first end 90 of the center bar 26 and gradually expand to be wider at the second end 92 of the center bar 26, for conforming to the shape of a person.

The wings 28 are attached to the second end portion 92 of center bar 26. The bars are formed of a relatively rigid material, such as a metal such as stainless steel titanium, or an alloy, a reinforced plastic, etc. The wings extend from opposite sides of center bar 26 and have curved configurations to conform to the shape of a person, particularly the upper leg portions or thighs.

The wings are adaptable to limited bending and twisting. Thus, they may be, as by using a pipe wrench, bent or "tweaked" slightly to provide improved fit relative to the thighs or upper legs of a person, thus to adapt to a particular individual. That is, they are bendable, inwardly, outwardly, and twistable in torsion.

The hazards of being bruised or injured by missing the belt and striking one's person with the end of a fish rod or handle, are substantially eliminated. The device presses into the groin area and with load thereon and appropriate adjustment, such striking of the person can be eliminated.

The structure of the rod belt flexes to a limited degree, with the wings bending and twisting under stress, the wings flexing inwardly and outwardly, and twisting to a certain degree in torsion about the center bar. Such bending and twisting distribute the load or weight across the legs more evenly. The wings flex and twist, thus to substantially prevent the device from "digging into" the body of the person, as occurs with square corners or hard features of prior fishing belt devices.

It is contemplated that the wings can be mounted in an articulating or hinged relation with the center bar (not shown) to provide a self-contouring arrangement.

The fishing rod handle may be positioned at different elevations by engaging a selected gimbal of the spaced-apart gimbals. The higher the person is able to grasp the fishing rod, the less pressure and force he must exert and the less pressure of the fishing rod handle on the belt. A person needs all the leverage he can get in handling a large fish.

The channel of the center bar serves to guide the person in moving the rod handle from one gimbal to another gimbal, thus to avoid "poking" at it with attendant possible personal injury to the person.

A rib 104 may be attached to or integrally formed with the wings 28. Preferably, each wing 28 has two ribs 104, one being positioned at a top edge of the wing 28 and another being positioned at a bottom edge of the wing 28 for providing support to the wings 28 during fishing. Alternatively, the rib 104 may be positioned in the center of the wings 28, parallel to the edges of the wings 28, facilitating twisting of the wings 28 as when conforming to a person's legs' configuration. As yet another alternative, referring to FIG. 10, the rib 104 may have a tapered configuration for enabling additional bending and torsion of the wings 28.

The gimbals or transverse rods 30 may preferably be formed of metal such as steel, or appropriate plastic. The gimbals are attached in spaced-apart relation to the center bar 26, as by welding end portions thereof to the channel walls 94, 96 of the center bar channel (FIG. 3), or by extending end portions of the gimbals through openings or holes 101 in the channel walls and securing them by nuts, lock washers, etc. (FIGS. 3 and 8). The removable attachments of the gimbals 30 to the center bar and to the waist bar 20 facilitate removal and replacement of gimbals. Quick attachment and removal could be provided by an appropriate snap-on arrangement (not shown).

FIG. 11 shows a modified fishing rod belt 100 according to the invention, wherein a modified channel 105 extends to substantially its full depth to the region of the waist bar 20, thus to provide improved strength, rigidity, and improved access and engagement by a fishing rod handle in the region of bar 20. The gimbals 30 are mounted and secured, as by welding, to the channel walls 94, 96.

Preferably, a plurality of gimbals 30 are positioned at spaced-apart locations for providing different positions of the fishing rod 12. A conventional fishing rod handle has defined therein a transverse slot for engaging on a gimbal 30. Referring to FIG. 7, the fishing rod 12 may be engaged with any of the gimbals 30 for positioning an end of the fishing rod 12 at points A, B, or C, maximizing the leverage and control obtained by using the fishing belt 10. One of the positions may be preferred over the others, depending on the size of the fisherman, the structure of the fishing boat, such as the boat rail heights, the position of the fisherman, and the weight of the fish. For example, it is desirable to pivot the fishing rod 12 in as low a position as is comfortable.

The pad material 32 is attached to the waist bar 20, the center bar 26 and the wings 28 for providing a comfortable barrier between the fishing rod belt 10 and the person. The pad material 32 may be formed from any type of durable material, for example, foam, such as an air-conditioning, insulating foam, fabric, or the like and is attached to the fishing rod belt 10 adhesively, by mechanical means, or the like.

The waist bar 20, center bar 26, wings 28 and ribs 44 and 102 may be formed by stamping, which also effects the bending to the wings 28 and waist bar 20. The stamping may be performed by a punchpress or by a hydraulic press and may be computer controlled. By deep draw stamping, the ribs can be stamped at the same time. After punching, the device is deburred and polished. Alternatively, the components of the fishing rod belt 10 may be formed by an English wheel process or by laser cutting.

An advantage of the fishing rod belt 10 is that the fishing rod belt 10 may be used for any type of fishing, not just deep sea fishing. The fishing rod belt 10 may be used by a fisherman in a standing or sitting position.

By utilizing a plurality of gimbals 30, the fishing rod 12 may be positioned at different elevations. Variations in the position of the fishing rod 12 provides variations in the leverage. The pressure generated by the drag mechanism of the reel and by the pulling on a fish in combination with the leverage effects the ability of the fisherman to reel in the fish.

The use of a plurality of gimbals 30 and the attachment of the gimbals 30 to a channel enables the quick and instant adjustment of the fishing rod. The channel serves as a guide for moving the fishing rod from one gimbal to another gimbal.

The flexibility of the fishing rod belt components enables the fishing rod belt 10 to conform to a person's upper leg or thigh configuration, thus to enable the load to be distributed over the area of a person's thighs in a relatively comfortable fit. Further, the compact design of the device, particularly the waist bar 20 and belt strap 22, enables a fisherman to move about a boat or pier without catching his fishing belt apparatus on the clothing, belts, etc., of other persons or boat components.

Thus there has been shown and described a novel fishing rod belt which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

I claim:

1. A fishing rod belt comprising:

means for supporting the fishing rod belt on a person, a center bar having a first end portion substantially rigidly connected with said means for supporting the rod belt on the person, a pair of wings attached to and extending oppositely from the center bar, said wings being configurated and adapted to engage upper portions of both legs of the person, and being adapted for limited deformation to better engage the upper portions of the legs, and means on said center bar adapted to engage a fishing rod.

2. A fishing rod belt according to claim 1, wherein:

said center bar defines a longitudinal channel, and said means on said center bar comprises at least one gimbal which extends across the channel.

3. A fishing rod belt according to claim 1, wherein:

said wings are adapted to flex to conform to the configuration of the upper portions of a person's legs.

4. A fishing rod belt according to claim 1, wherein:

said center bar is adapted to twist in response to forces on the wings to enable the wings to better conform to the upper portions of a person's legs.

5. A fishing rod belt according to claim 1, wherein said wings are flexible inwardly, outwardly, and in torsion.

6. A fishing rod belt according to claim 1, wherein said wings have a curved configuration for conforming to an upper portion of a person's legs.

7. A fishing rod belt according to claim 1, wherein:

a front portion of the belt is substantially rigid and is adapted to extend across the abdomen of the person.

8. A fishing rod belt according to claim 7, wherein:

said center bar and said wings comprise a unitary structure.

9. A fishing rod belt according to claim 7, wherein:

a front portion of the belt is substantially rigid and cooperates with the center bar and said wings to provide a unitary structure.

10. A fishing rod belt according to claim 1, wherein:

said center bar and said wings comprise a unitary structure.

11. A fishing rod belt according to claim 1, further comprising a rib attached to each of said wings for providing support to said wings during bending and twisting of said wings.

12. A fishing rod belt comprising:

means for supporting the fishing rod belt on a person, a center bar having a first end portion connected with said means for supporting the fishing rod belt on the person, said means for supporting the fishing rod belt including a substantially rigid arcuate waist bar attached to said center bar and adapted to extend about a portion of the waist of the person, a pair of wings attached to and extending oppositely from the center bar, said wings being configurated and adapted to engage upper portions of the legs of the person, and being adapted for limited deformation to better engage the upper portions of the legs, and means on said center bar adapted to engage a fishing rod.

13. A fishing rod belt according to claim 12, wherein:

said waist bar, said center bar, and said wings are formed of rigid material.

14. A fishing rod belt according to claim 12, wherein:

the center bar has a first end portion attached to said waist bar, said center bar defines a longitudinal channel having a first edge wall and a second edge wall, and a plurality of spaced-apart gimbals attached to said first and second edge walls to extend across the channel for selective engagement with a fishing rod.

15. A fishing rod belt comprising:

a belt configurated and sized to extend about the waist of a person, a center bar having a first end portion attached to said belt, said center bar defining a longitudinal channel, having a first edge wall and a second edge wall, a plurality of gimbals attached to said first and second edge walls to extend across the channel, a pair of wings attached to and extending oppositely from a lower portion of the center bar, and at least one gimbal secured to said center bar and positioned for engagement with a fishing rod.

16. A fishing rod belt according to claim 15, wherein said gimbals are attached to said walls by welding.

17. A fishing rod belt according to claim 15, wherein said gimbals are attached to said walls by threaded fasteners.

18. A fishing rod belt, comprising:

a waist bar sized and adapted to extend about a portion of the waist of a person, a belt strap having a first belt portion and a second belt portion, at least one of said first and second belt portions being attached to said waist bar, and said belt strap being sized and adapted to extend about a portion of the waist of a person, a latch having a first latch mechanism and a second latch mechanism, said first latch mechanism attached to one of said first and second belt portions, and said second latch mechanism attached to one of said waist bar and the other of said first and second belt portions of said belt strap for securing said fishing rod belt about the waist of the person, a center bar having a first end portion and a second end portion, said first end portion being attached to said waist bar, a pair of wings attached to and extending oppositely from said second end portion of said center bar, and a plurality of gimbals attached to said center bar in spaced relation for selective engagement with a fishing rod.

19. A fishing rod belt according to claim 18, wherein said belt bar, said center bar, and said wings are formed of a rigid material.

20. A fishing rod belt according to claim 18, wherein:

said center bar defines an indentation adjacent to a gimbal for accommodating an end portion of the fishing rod.

21. A fishing rod belt according to claim 18, wherein:

said first latch mechanism includes at least one slot having a first opening and a second opening, said second opening having an enlarged portion, and said second latch mechanism includes a pin having a first end and a second end, said second end having an enlarged portion sized and adapted to fit within said second opening of said slot, and said first end sized and adapted to slide within said first opening of said slot for capturing said pin within said first opening for securing said first and second ends of said belt member together.

22. A fishing rod belt according to claim 18, and further comprising:

a pad material attached to said waist bar, said center bar and said wings for providing a comfortable barrier between said waist bar, said center bar and said wings and the person.

23. A fishing rod belt according to claim 18, wherein a gimbal is attached to said waist bar.

24. A fishing rod belt according to claim 18, wherein:

said wings are adapted to flex to conform to the configuration of the upper portions of a person's legs.

25. A fishing rod belt according to claim 18, wherein:

said center bar is adapted to twist in response to forces on the wings to enable the wings to conform to the upper portions of a person's legs.

26. A fishing rod belt according to claim 18, further comprising a rib attached to each of said wings for providing support to said wings during bending and twisting of said wings.

27. A fishing rod belt according to claim 26, wherein said rib has a tapered configuration.

28. A fishing rod belt according to claim 18, wherein said wings have a curved configuration for conforming to an upper portion of a person's legs.

* * * * *